(12) United States Patent
Piazza

(10) Patent No.: US 7,551,132 B2
(45) Date of Patent: Jun. 23, 2009

(54) GPS RECEIVER WITH FAST ACQUISITION TIME

(75) Inventor: Francesco Piazza, Bioggio (CH)

(73) Assignee: NemeriX SA, Manno (CH)

( * ) Notice: Subject to any disclaimer, the term of this patent is extended or adjusted under 35 U.S.C. 154(b) by 233 days.

(21) Appl. No.: 11/324,976

(22) Filed: Jan. 3, 2006

(65) Prior Publication Data

US 2006/0227046 A1    Oct. 12, 2006

Related U.S. Application Data

(63) Continuation of application No. PCT/EP2004/051336, filed on Jul. 2, 2004.

(51) Int. Cl.
    *G01S 5/14* (2006.01)
(52) U.S. Cl. .................................. 342/357.12
(58) Field of Classification Search .................. None
    See application file for complete search history.

(56) References Cited

U.S. PATENT DOCUMENTS 5,535,237 A * 7/1996 LaPadula et al. ............ 375/130
5,955,986 A   9/1999 Sullivan
6,208,291 B1 * 3/2001 Krasner .................. 342/357.12
6,611,756 B1 * 8/2003 Chen et al. .................... 701/213
6,744,404 B1 * 6/2004 Whitehead et al. ..... 342/357.12
2003/0081660 A1 * 5/2003 King et al. .................... 375/150
2006/0082496 A1 * 4/2006 Winternitz et al. ..... 342/357.06

FOREIGN PATENT DOCUMENTS

| EP | 1198068 A1 * | 4/2002 |
| EP | 1 205 764 A  | 5/2002 |
| EP | 1205764 A *  | 5/2002 |

* cited by examiner

*Primary Examiner*—Gregory C Issing
(74) *Attorney, Agent, or Firm*—Pearne & Gordon LLP

(57) ABSTRACT

Method for acquiring a plurality of GPS signals, in which the signals received from the space vehicles are correlated, in an array of parallel processing modules (20) with local replicas of a pseudorandom code. The local pseudorandom code generators are slewed periodically, on detection of an external periodical trigger INT_ACC, and the correlation data are dumped simultaneously to all processing modules in output registers for acquisition and tracking software. The integration period is shorter than the natural period of the pseudorandom code sequence, and all the local generators are slewed at the same time, thereby allowing a quicker acquisition of the SV C/A code.

9 Claims, 2 Drawing Sheets

GPS RECEIVER WITH FAST ACQUISITION TIME

REFERENCE DATA

This application is a continuation of PCT/EP2004/051336, filed Jul. 2, 2004, which claims priority from U.S. provisional patent application 60/484,737, filed on Jul. 3, 2003, which is hereby incorporated by reference.

FIELD OF THE INVENTION

Subject of the present invention is a navigation satellite receiver, and more particularly a GPS receiver circuit wherein the acquisition time, that is the time needed to obtain a first positional fix after a complete shutdown of the system is particularly low.

DESCRIPTION OF RELATED ART

GPS receiver system are nowadays used in a multitude of application, and it can be truly said that after a start phase, in which its applications were essentially confined to military, research, and few specialized fields, like maritime navigation, GPS is rapidly finding a place in many other professional and leisure applications.

As it is known, a GPS receiver is designed to determine its location by correlating the radio signal emitted from a constellation of space vehicles orbiting around the earth. It is a common problem with GPS receivers that they require a long start-up time before delivering a first positional fix after a cold start.

During this start-up time the receiver has to acquire the signal of the available space vehicles, and download the navigational data from the 50 bps GPS NAV stream or from other sources. These operations are inherently time-consuming, so that the start time after a cold start is commonly of the order of several tens of seconds.

This long start-up time, often indicated as time to the first fix (TTFF), is a limiting factor in many applications of GPS. In particular in certain low-rate, low power applications, like for example location services in portable telecommunication networks and the like, where it would be desirable to supply the GPS module only for short periods of time.

An object of the present application is a GPS receiver overcoming the above shortcoming of the prior art, and a GPS receiver providing a faster time for delivering a first positional fix

BRIEF SUMMARY OF THE INVENTION

The above object is attained by a GPS receiver comprising the characteristics of the appended claims, and in particular by Signal processor for use in a navigation satellite receiver, comprising a plurality of tracking modules, for processing a plurality of navigation ranging signals, each tracking module comprising:
  a pseudorandom code generator, for generating a replica code sequence;
  a correlator, for obtaining a time-integrated correlation value between a navigation ranging signal and said replica code sequence;

wherein said signal processor has a first functioning mode, and said signal processor is arranged to simultaneously dump said time-integrated correlation values from said multiplicity of tracking modules when in said first functioning mode.

DETAILED DESCRIPTION OF THE INVENTION

Figure 1:
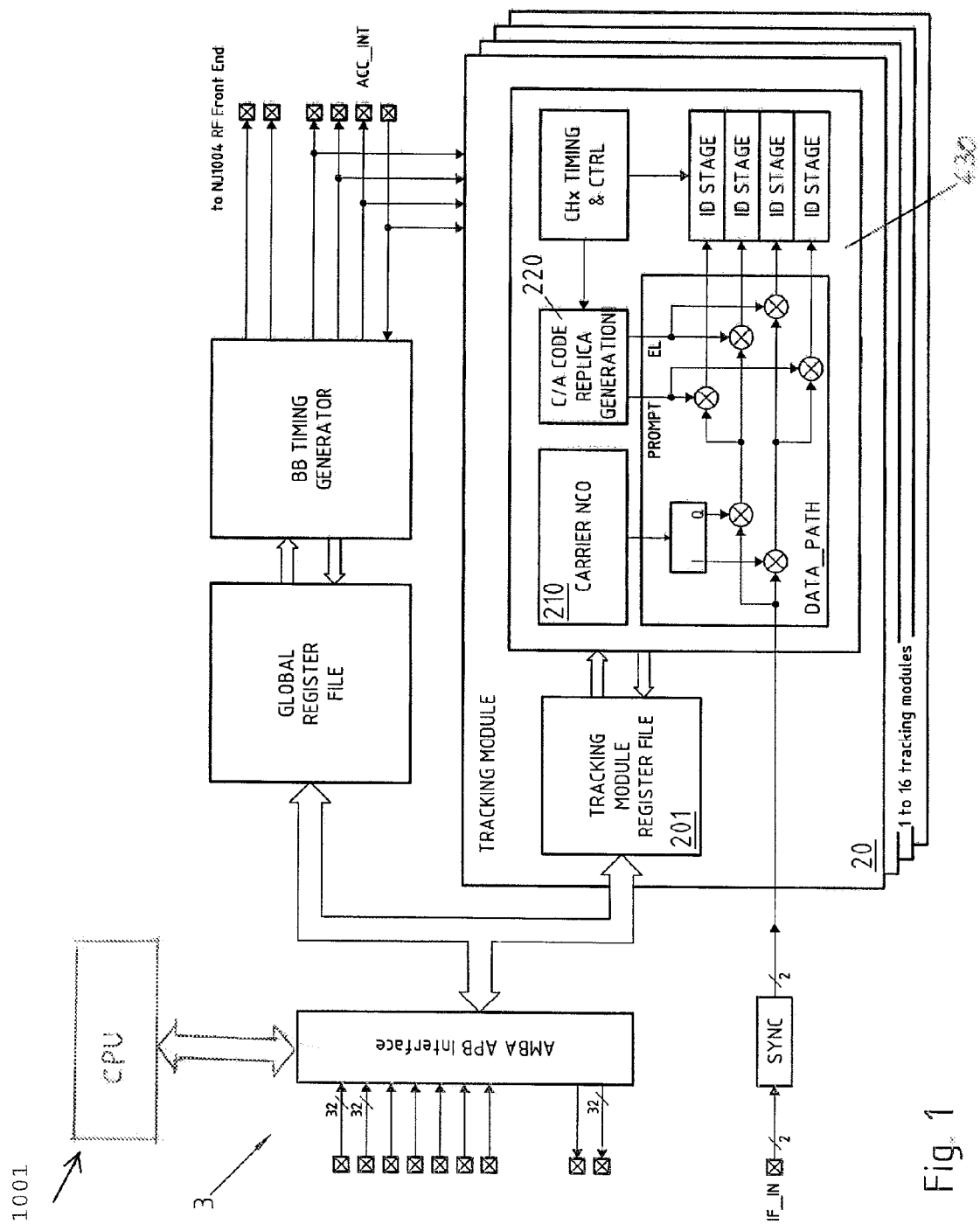
FIG. 1 shows a GPS processor according to the present invention.

In a typical GPS Receiver the 1575.42 MHz signal received from the Space Vehicles (SV) is down-converted to an intermediate frequency (IF), for example 4.092 MHz by an appropriate RF front-end. An example of a RF down-converter adapted to this function is described in European Patent Application EP 1'198'068, in the name of the applicant, which is hereby incorporated by reference.

The IF signal is then fed, among others, to a correlation processor 3 according to the invention, whose function is to de-spread the signals received from each SV, and to align them temporally with locally generated copies of the pseudorandom ranging codes specific for each SV, for example, in case of a GPS receiver, the correlation processor 3 has the task of demodulating and tracking the coarse acquisition (C/A) GPS ranging signals. To perform such alignment the correlators processor 3 comprises an array of tracking modules 20, each of which comprises two numerically controlled oscillators 210 and 220, for further converting the IF signal and generating a baseband signal.

Each tracking module 20 comprises also, in a tracking unit 430, a local Gold pseudorandom code generator 220, for generating a local replica of the C/A code corresponding to a particular GPS Space Vehicle. The Gold pseudorandom codes can be generated internally, for example by a tapped shift register, or, equivalently, extracted from a preloaded table or by any other technique.

The Gold code generator 220 is piloted by an independent numerically controlled C/A clock at about 1.023 MHz. The exact frequency of the local carrier frequency as well as the local C/A code frequency are adjusted, by an external CPU 1001, to compensate for Doppler shift on the SV signal and local oscillator drift and bias. The incoming IF signal is multiplied by the in-phase (I) and quadrature (Q) components of the local carrier and by two time-shifted versions of the replica C/A code. The result of these operations is integrated for a programmable period of time, to generate an integrated correlation value, which is loaded into a tracking module register file 201 at the end of each integration period, to be accessible to the external CPU 1001.

In addition to the prompt correlation value, the tracking module also generates a late correlation value and an early correlation value, which are obtained by multiplying the GPS signal with a ½ chip delayed and a ½ chip advanced version of the local replica code. These late and early correlation values are employed in the tracking algorithm, as it will be explained later.

The external CPU 1001 reads the correlation value stored in the registers 201 of each tracking module 20, and implements SV acquisition and tracking algorithms. In the first case the acquisition algorithm repeatedly shifts the replica C/A code generated in a tracking module 20, by issuing a series of "slew" commands to said tracking unit, until a sufficient correlation level is reached, whereupon the CPU 1001 switches to tracking mode. In order to speed up the acquisition and to reduce the load on the external CPU 1001 and on the bus, the tracking module can be instructed by the external CPU 1001 to autonomously slew the replica C/A code on a periodical basis, for example every 1, 2 or 4 C/A code periods.

In the tracking mode the external CPU 1001 stops the periodical slewing and continuously monitors the integrated correlation value, and also the early and late correlation values described above. By comparing the current, early and late correlation the CPU 1001 keeps the replica C/A code time-aligned with the C/A code coming from the Space Vehicle, by appropriately adapting the replica C/A code offset and the frequency of the C/A clock, as it is known in the art.

According to the tracking strategy chosen, the tracking module can also compute a difference between early and late correlation (early minus late or EML), or alternate between early, prompt and late correlations. All these modes of functioning can be selected by the CPU, for example by acting on appropriate registers in the register file 210, and are autonomously taken in charge by the tracking module 20, without the need to interfere with the C/A code generator 220.

During tracking, as long as the local and received C/A codes remain aligned, the 50 bps GPS navigation message can be extracted. At the same time the amount by which the replica C/A code must be shifted of keep is aligned with the incoming signal is proportional to the pseudo-range between the receiver ant one particular Space Vehicle. If at least four tracking modules 20 track four different space vehicles, and as soon as a sufficient portion of the navigation message has been downloaded, a positional fix is possible.

The complete start-up sequence, which is needed when the system is switched on without a previous knowledge of satellite orbit parameters, comprises then the two phases of:
1. Acquiring and tracking sufficient number of GPS C/A signals on several tracking modules, by delay-locking the locally generated C/A code with the incoming C/A codes. In principle a minimum of four satellites is needed, to solve the four unknown of the problem: latitude, longitude, altitude and time. A set of measurements is generated by the signal processor on each of the tracked signals.
2. Obtaining satellite orbit parameters and almanacs data. If this step is carried out by use of the GPS navigation data, it can be rather long, due to the low bandwidth of such signal. A minimum of 30 seconds is required for the transmission of a navigation frame. Since navigation data do not carry ranging information, they need not be downloaded from the space vehicle, however, and can also be obtained by other higher-bandwidth sources or, at least in part, stored in permanent or semipermanent tables inside the receiver.

Figure 2:
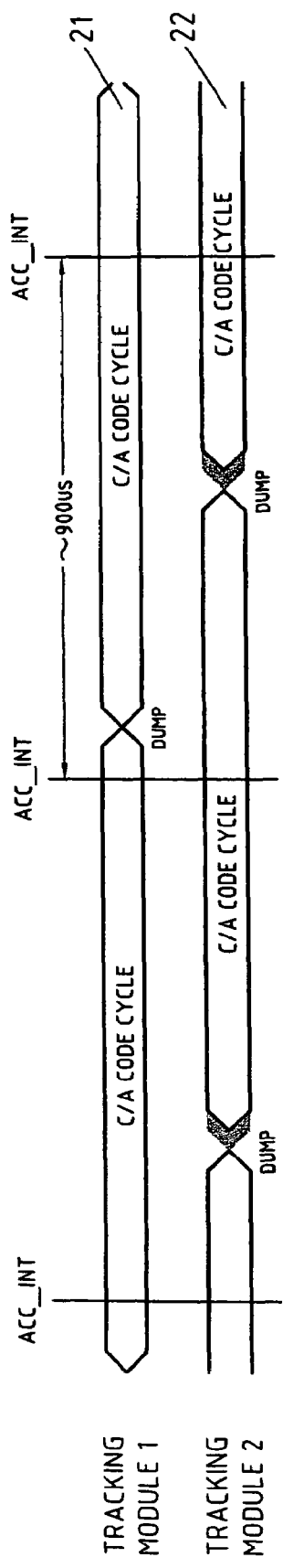
FIG. 2 shows a timing diagram of a signal processor according to the present invention.
Figure 2:
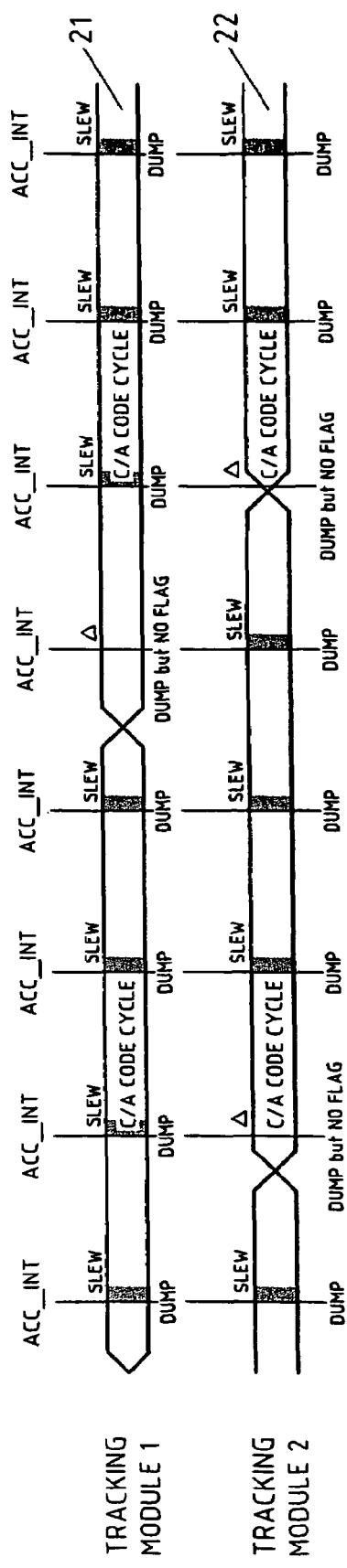

The tracking module of the signal processor of the invention comprises also a special fast acquisition mode, whose aim is to speed up the acquisition phase 1 above. FIG. 2 shows a time diagram of the fast acquisition mode (FAM) compared to the standard acquisition and tracking mode (SAM).

During standard acquisition mode the integrated correlation values in each tracking module are dumped into the output register at each C/A code overflow, that is the end of each C/A code period. In this way the correlation value is maximized.

Dump times are therefore independent and uncorrelated for each tracking module, being only determined by the phase of the replica C/A code. The upper part of FIG. 2 shows the relative timing of two tracking modules, one of which 21, is in tracking mode, while the other 22, is in acquisition mode, with the C/A code slewed at each code overflow. The CPU reads periodically the register 210 of all the tracking modules 21, 22 in order to detect the completion of acquisition phases, and to implement the chosen tracking strategy. This is done in correspondence with the periodical interrupt ACC_INT.

The lower part of figure 2 illustrates the fast acquisition mode FAM. FAM differs from SAM in that the accumulated data is dumped by the tracking unit 430 into the registers 210 on the $ACC_{13}$ INT signal, which is common to all tracking modules, instead of on C/A code overflow. Therefore the length of the integration period in the tracking modules is determined by the ACC_INT period. By reducing the integration time it is possible to proportionally reduce the acquisition time of correlation data. A direct consequence of the reduced integration period, however, is that lover correlation levels are expected. The reduced integration time also increases the signal processor frequency bandwidth. As a consequence the scanning of the frequency space necessary during SV acquisition can be executed with larger steps (frequency bin). This further reduces the SV acquisition time. Only strong SV signals with a high signal-to noise ratio will produce reliable correlation values which can be detected in SAM mode. A cold start is the main application of SAM mode, during which an exhaustive search for all the available SV is made.

In FAM mode each tracking module 20 automatically detects whether a C/A code overflow occurred within the last integration period. In this case data is dumped normally, but a special flag bit in the register file 210 is utilized to signal this to the CPU. This avoids interpreting a data bit transition of the GPS signal during FAM integration (which would result in a very low correlation value) as a C/A code misalignment. By checking the flag bit the software running on the CPU can skip over this data.

As with SAM mode, the slew repeat option allows automatic slewing of the C/A code by 1 chip (or more) one each new ACC_INT. Software can check new correlation values with the slewed C/A code sequence without intervening with C/A code generation. Again, to avoid the effect of a GPS data bit transition, C/A code slewing is automatically inhibited (even with the slew repeat option enabled) in the integration following a C/A code overflow.

The invention claimed is:

1. A method for slewing pseudorandom code generators comprising the steps of:
   acquiring a plurality of navigation ranging signals from a plurality of space vehicles;
   correlating said navigation ranging signals with one of a plurality of local signals generated by a plurality of pseudorandom code generators, for obtaining a plurality of time-integrated correlation values; and
   slewing said pseudorandom code generators until said local signals are time-aligned with pseudorandom signals contained in said navigation ranging signals;
   wherein said slewing of said pseudorandom code generators takes place simultaneously and periodically for all said code generators, with a repetition period which is shorter than the proper period of said local signals.

2. A method for acquiring a plurality of navigation ranging signals from a plurality of space vehicles, said method comprising the steps of:
   correlating said navigation ranging signals with one of a plurality of local signals generated by a plurality of pseudorandom code generators for obtaining a plurality of time-integrated correlation values; and
   dumping said time-integrated correlation values into corresponding registers, wherein
   said dumping of said time-integrated correlation values takes place simultaneously and periodically, for all said code generators, with said dumping having a repetition period that is shorter than the proper period of said local signals.

3. The method of claim 2, further comprising the step of slewing said pseudorandom code generators of a predetermined value at each dump.

4. The method of claim 2, further comprising the steps of:
   detecting an overflow in said pseudorandom code generators; and
   raising a inhibit flag corresponding to said overflow.

5. The method of claim 4, further comprising the step of processing said time-integrated correlation values in a CPU, wherein the correlation values marked with said inhibit flag are not processed.

6. A system for processing a plurality of navigation ranging signals in a navigation satellite receiver, comprising:
   a plurality of pseudorandom code generators each for generating a local signal to thereby provide a plurality of local signals;
   a plurality of registers; and
   a plurality of tracking modules, wherein each of said tracking modules includes at least one of said pseudorandom code generators and at least one of said registers, wherein
   said system is operatively adapted for correlating said navigation ranging signals with one of said plurality of local signals for obtaining a plurality of time-integrated correlation values; and wherein
   said system is also adapted for dumping said time-integrated correlation values into corresponding ones of said registers, wherein said dumping of said time-integrated correlation values takes place simultaneously and periodically, for all said pseudorandom code generators, with a repetition period that is shorter than the proper period of said local signals.

7. The signal processing system of claim 6, further adapted for slewing said pseudorandom code generators of a predetermined value at each dump.

8. The signal processing system of claim 6, further adapted for detecting an overflow in said pseudorandom code generators and raising an inhibit flag corresponding to said overflow.

9. The signal processing system of claim 6, comprising a CPU programmed to process said time-integrated correlation values, wherein said CPU is also programmed to skip processing correlation values marked with the inhibit flag.

* * * * *

UNITED STATES PATENT AND TRADEMARK OFFICE
CERTIFICATE OF CORRECTION

| | | |
|---|---|---|
| PATENT NO. | : 7,551,132 B2 | Page 1 of 1 |
| APPLICATION NO. | : 11/324976 | |
| DATED | : June 23, 2009 | |
| INVENTOR(S) | : Francesco Piazza | |

It is certified that error appears in the above-identified patent and that said Letters Patent is hereby corrected as shown below:

In the Specifications:

Column 4, Line 4: Delete the number "$_{13}$" between the "ACC" and "INT" and insert --_-- to read as follows: ACC_INT Signed and Sealed this Fourth Day of August, 2009

JOHN DOLL
*Acting Director of the United States Patent and Trademark Office*